(12) United States Patent
Goetzenberger

(10) Patent No.: US 9,762,166 B2
(45) Date of Patent: Sep. 12, 2017

(54) METHOD FOR FIELD-ORIENTED CONTROL OF A FREQUENCY CONVERTER FOR A THREE-PHASE MOTOR

(71) Applicant: CONTINENTAL AUTOMOTIVE GMBH, Hannover (DE)

(72) Inventor: Martin Goetzenberger, Ingolstadt (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/248,201

(22) Filed: Aug. 26, 2016

(65) Prior Publication Data

US 2017/0063266 A1    Mar. 2, 2017

(30) Foreign Application Priority Data

Aug. 26, 2015  (DE) .................. 10 2015 216 309

(51) Int. Cl.
*H02P 21/00* (2016.01)
*H02P 21/28* (2016.01)

(52) U.S. Cl.
CPC .................................. *H02P 21/28* (2016.02)

(58) Field of Classification Search
CPC .......... H02P 21/18; H02P 21/24; H02P 21/14; H02P 23/14; H02P 27/06; H02P 6/185; H02P 21/00; H02P 21/10; H02P 21/28
USPC ............ 318/400.02, 400.04, 400.07, 400.15, 318/400.26, 400.38, 722
See application file for complete search history.

(56) References Cited

U.S. PATENT DOCUMENTS

| | | | | |
|---|---|---|---|---|
| 4,814,677 A * | 3/1989 | Plunkett | ............... | H02P 6/08 |
| | | | | 318/400.02 |
| 8,129,936 B2 | 3/2012 | Becker et al. | | |
| 8,552,672 B2 * | 10/2013 | Bucella | ............... | H02P 25/02 |
| | | | | 318/400.2 |
| 8,853,979 B2 * | 10/2014 | Wu | ............... | H02P 6/20 |
| | | | | 318/400.02 |
| 8,872,455 B2 * | 10/2014 | Tremel | ............ | H02M 7/53871 |
| | | | | 318/400.22 |
| 8,884,566 B2 * | 11/2014 | Cao | ............... | H02P 6/183 |
| | | | | 318/400.2 |
| 2014/0333241 A1 | 11/2014 | Zhao et al. | | |

FOREIGN PATENT DOCUMENTS

DE     102006052042 A1    5/2008
DE     102014106668 A1    4/2015

* cited by examiner

*Primary Examiner* — Bentsu Ro
*Assistant Examiner* — Thai Dinh
(74) *Attorney, Agent, or Firm* — Laurence A. Greenberg; Werner H. Stemer; Ralph E. Locher

(57) ABSTRACT

A method for field-oriented control of a frequency converter for a three-phase motor includes the setting of a new position of the rotary field in the electric motor being performed by voltage pulses for the stator coils. An amplitude and the angle of the rotary field vector are specified by the duration of the voltage pulses for the respective coils and by their temporal offset. The duration and the offset of voltage pulses for the stator coils are the result of the calculation of manipulated variables in a digitally controlled process in a coordinate system fixed in respect of the rotor, depending on the prevailing angular rotation (theta) and the prevailing speed of rotation (omega) as well as on the prevailing current values, a predetermined torque and a predetermined speed of rotation.

3 Claims, 2 Drawing Sheets

$$\begin{pmatrix} U_a \\ U_b \end{pmatrix} = \begin{pmatrix} \cos(\Theta_0 + \Delta\Theta) & -\sin(\Theta_0 + \Delta\Theta) \\ \sin(\Theta_0 + \Delta\Theta) & \cos(\Theta_0 + \Delta\Theta) \end{pmatrix} * \begin{pmatrix} U_d \\ U_q \end{pmatrix} = \begin{pmatrix} \cos(\Theta_0) & -\sin(\Theta_0) \\ \sin(\Theta_0) & \cos(\Theta_0) \end{pmatrix} * \begin{pmatrix} \cos(\Delta\Theta) & -\sin(\Delta\Theta) \\ \sin(\Delta\Theta) & \cos(\Delta\Theta) \end{pmatrix} * \begin{pmatrix} U_D \\ U_q \end{pmatrix} =$$

$$= \begin{pmatrix} U_{a0} \\ U_{b0} \end{pmatrix} * \begin{pmatrix} \cos(\Delta\Theta) & -\sin(\Delta\Theta) \\ \sin(\Delta\Theta) & \cos(\Delta\Theta) \end{pmatrix} * \begin{pmatrix} U_D \\ U_q \end{pmatrix} * \begin{pmatrix} 1 & -\Delta\Theta \\ \Delta\Theta & 1 \end{pmatrix}$$

$$\begin{pmatrix} u_\alpha \\ u_\beta \end{pmatrix} = \begin{pmatrix} \cos(\Theta_0 + \Delta\Theta) & -\sin(\Theta_0 + \Delta\Theta) \\ \sin(\Theta_0 + \Delta\Theta) & \cos(\Theta_0 + \Delta\Theta) \end{pmatrix} * \begin{pmatrix} u_d \\ u_q \end{pmatrix} = \begin{pmatrix} \cos(\Delta\Theta) & -\sin(\Delta\Theta) \\ \sin(\Delta\Theta) & \cos(\Delta\Theta) \end{pmatrix} * \begin{pmatrix} \cos(\Theta_0) & -\sin(\Theta_0) \\ \sin(\Theta_0) & \cos(\Theta_0) \end{pmatrix} * \begin{pmatrix} u_d \\ u_q \end{pmatrix}$$

$$\begin{pmatrix} u_\alpha \\ u_\beta \end{pmatrix} = \begin{pmatrix} \cos(\Delta\Theta) & -\sin(\Delta\Theta) \\ \sin(\Delta\Theta) & \cos(\Delta\Theta) \end{pmatrix} * \begin{pmatrix} 1 & -\Delta\Theta \\ \Delta\Theta & 1 \end{pmatrix} * \begin{pmatrix} u_d \\ u_q \end{pmatrix}$$

Fig. 2

METHOD FOR FIELD-ORIENTED CONTROL OF A FREQUENCY CONVERTER FOR A THREE-PHASE MOTOR

CROSS-REFERENCE TO RELATED APPLICATION

This application claims the priority, under 35 U.S.C. §119, of German application DE 10 2015 216 309.1, filed Aug. 26, 2015; the prior application is herewith incorporated by reference in its entirety.

BACKGROUND OF THE INVENTION

Field of the Invention

Frequency converters for three-phase motors nowadays operate almost without exception using microcontrollers which take over the whole task of controlling and generating the drive signals for the stator coils of the motor. The drive signals here are pulse-width modulated (PWM), so that the desired position of the rotary field can be adjusted by the pulse duration of the signals. This method is also to be used for motors with high rotary speeds and at high drive frequencies. The switching frequency is critical here in respect of the desired sinusoidal form of the motor drive signals.

In order to ensure optimum drive to the motor, offset clocking is chosen as the drive scheme. The microcontroller here modulates both edges of the PWM signals. The motor thus receives an appropriate voltage pulse at each edge. Inside the controller this is preferably done by a timer that counts upwards from zero to a maximum for the first edge, and counts downwards to zero for the second edge. The contents of three compare registers for the three phases are compared with the counter status. The raw signals for the end-stage transistors are generated from the counter direction and the compare-match signals.

Since at high rotary speeds the motor has already significantly turned within the half-period of the PWM signal, the compare values are preferably calculated afresh for each edge. For example, at 100,000 rpm, with two pole pairs and a switching frequency of 25 kHz, the field of the motor turns by 24° between one switching edge and the next switching edge. Thus at a switching frequency of 25 kHz, a time of only 20 μs is available. This means that it is necessary to use a microcontroller with a very high computing power.

Since the necessary computing power is not usually available with the microprocessors typically used for such applications, compromises must be made. Frequently, a first step is to omit calculation of both edges. This halves the necessary computing power. Parts of the field-oriented control are then calculated at an even lower rate, which is in fact fully adequate in the case, for example, of a speed controller, due to its low bandwidth. This does, however, lead to an unsatisfactory lack of precision.

SUMMARY OF THE INVENTION

It is the object of the invention to permit satisfactory precision with the lowest possible required computing power.

The object is achieved by a method for field-oriented control of a frequency converter for a three-phase motor, in which the setting a new position of the rotary field in the three-phase motor is performed by use of voltage pulses for the stator coils, wherein the amplitude and the angle of the rotary field vector are specified by the duration of the voltage pulses for the respective coils and by their temporal offset.

The duration and the offset of voltage pulses for the stator coils are the result of the calculation of manipulated variables in a digitally controlled process in a coordinate system fixed in respect of the rotor, depending on the prevailing angular rotation and the prevailing speed of rotation as well as on the prevailing current values, a predetermined torque and a predetermined speed of rotation, where the manipulated variables calculated in the coordinate system that is fixed in respect of the rotor are converted through a reverse transformation into manipulated variables in a coordinate system fixed in respect of the stator, and the times for the edges of the voltage pulses are determined from these manipulated variables in the coordinate system fixed in respect of the stator. The calculation of the manipulated variables in the coordinate system fixed in respect of the stator for the second edge of a voltage pulse is divided into two partial calculations for the angle of rotation for the first edge and the angle of rotation from the first to the second edge, wherein the first partial calculation for the first edge has already been calculated, and the second partial calculation is used for a predetermined number of coordinate rotations.

A complete reverse transformation is thus also no longer calculated. The coordinate rotation for the second edge is instead divided into two partial rotations. The first rotation of the coordinates has already been calculated for the first edge, the second partial rotation always occurs at the same angle for the same speed of rotation, so that the transformation matrix, in which computationally intensive sine and cosine calculations are necessary, only has to be recalculated comparatively rarely. The second rotation of the coordinate system thus only represents a multiplication of a vector with a matrix, which many microcontrollers can deal with extremely quickly.

In one advantageous embodiment, a cosine of the partial angle of rotation is approximated by 1 and a sine of the partial angle of rotation is approximated by the angle itself in the reverse transformation matrix of the second partial calculation.

The second rotation matrix can thus be calculated by an approximation with high dynamic performance. Since the angle is small, the cosine of the additional angle can be approximated by 1, while the sine of the angle can be approximated by the angle itself.

In an advantageous development of the invention, the value of the time for the first edge of a voltage pulse is used for calculating the time for the second edge of this voltage pulse, and the reverse transformation into the coordinate system fixed in respect of the stator is performed by an angle of rotation that is extrapolated from the angle of rotation for the first edge of the voltage pulse and the speed of rotation.

It is thus not the case that individually calculating the edges is also omitted, although the second edge does not result from a fully computed field position in a field-oriented control system.

The calculation of the current controllers is omitted. In order to continue to achieve a smooth voltage form, the field angle is extrapolated from the speed of rotation and the field angle most recently calculated from the stator coil currents, although the previously calculated voltage values are used again. The calculation for the second edge thus now only consists of the reverse transformation into the coordinate system fixed in respect of the stator by the extrapolated field angle.

A particularly exotic combination is possible in which the coordinate rotation of the first edge is used together with a further rotation for the second edge, but in which the current controllers are nevertheless recalculated.

Parts of the field-oriented control are thus replaced in a manner according to the invention by extrapolations that can be calculated much faster. In addition, the particularly complex coordinate rotation is replaced by an apparently more complex double rotation which can, however, be calculated significantly faster, since the first complex partial rotation has already been fully calculated, and the computationally intensive part for the second rotation is rarely calculated, or the calculation is approximated.

Other features which are considered as characteristic for the invention are set forth in the appended claims.

Although the invention is illustrated and described herein as embodied in a method for field-oriented control of a frequency converter for a three-phase motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is an illustration showing the conversion from coordinates that are fixed in respect of the a rotor into coordinates that are fixed with respect to the stator using a calculation of two partial rotations according to the invention.

DETAILED DESCRIPTION OF THE INVENTION

Figure 1:
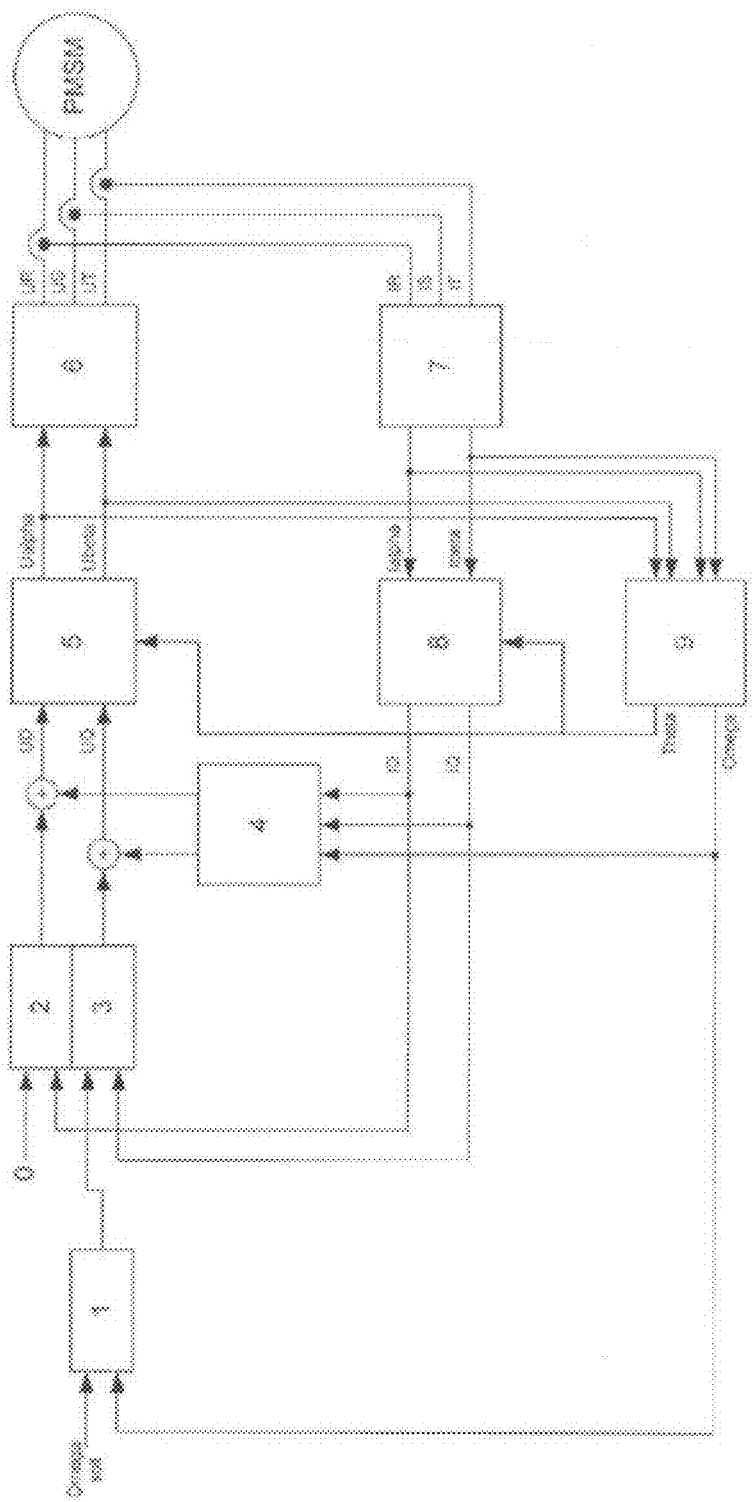
FIG. 1 is a schematic illustration of a frequency converter with field-oriented control for a three-phase motor with a permanent magnet motor according to the prior art.

Referring now to the figures of the drawings in detail and first, particularly to FIG. 1 thereof, there is shown a synchronous three-phase motor with a permanent magnet rotor PMSM is driven in the known manner using three pulse-modulated voltages UR, US, UT. The pulse-modulated voltages UR, US, UT are generated by a modulation unit 6 which, for example, carries out a vector modulation.

The currents IR, IS, IT which flow through the stator coils of the three-phase motor as a result of the pulse-modulated voltages UR, US, UT are detected, for example by use of shunt resistors, and are supplied to a transformation unit 7 which calculates from these the current pointers Ialpha, Ibeta representing the field position in the motor in a complex coordinate system fixed in respect of the stator.

The current pointers Ialpha, Ibeta of the coordinate system fixed in respect of the stator are converted in a conversion unit 8 into the current pointers ID, IQ in a coordinate system fixed in respect of the rotor. This requires the angle of the rotor position theta, which is determined in a rotor position estimator 9 from the pointers Ialpha, Ibeta of the coordinate system fixed in respect of the stator and the manipulated variables Ualpha, Ubeta in the coordinate system fixed in respect of the stator.

The current pointers ID and IQ of the coordinate system fixed in respect of the rotor are supplied to a current controller ID 2 or to a current controller IQ 3, wherein the current controller ID 2 controls the field-forming or field-weakening current ID and, in the example illustrated, is supplied with a setpoint variable of 0, since neither field reinforcement nor field attenuation are wanted. The current controller IQ 3 is supplied with a setpoint variable for the torque-developing current IQ. This setpoint variable is made available by a speed controller 1, to which on the one hand a setpoint rotation speed omega_set and on the other hand a prevailing rotation speed omega determined by the rotor position estimator 9 are supplied.

The output signals of the current controller ID 2 and of the current controller IQ 3 are each added to an output signal of a decoupling or pre-control unit 4, to which both the current pointers ID, IQ of the coordinate system fixed in respect of the rotor, as well as the prevailing speed of rotation omega are supplied. The voltage pointers UD, UQ of the coordinate system fixed in respect of the rotor obtained by the additions are passed to a reverse transformation unit 5 which, using the rotor position angle theta from the rotor position estimator 9, transforms the voltage pointers UD, UQ of the coordinate system fixed in respect of the rotor into the voltage pointers Ualpha, Ubeta of the coordinate system fixed in respect of the stator. These voltage pointers Ualpha, Ubeta of the coordinate system fixed in respect of the stator are passed to the modulation unit 6.

The reverse transformation from the coordinate system fixed in respect of the rotor into the coordinate system fixed in respect of the stator is highly computationally intensive, but should however be carried out at high speeds of rotation for both edges of a pulse-modulated drive signal for a three-phase motor, since the rotor can rotate onwards significantly during the period of the drive signal.

The transformation matrix for calculating the voltage pointers $U_\alpha$, $U_\beta$ of the coordinate system fixed in respect of the stator from the voltage pointers $U_D$, $U_Q$ of the coordinate system fixed in respect of the rotor is illustrated in FIG. 2 in the upper line in the formula on the left.b The calculation of the sine and cosine values for the new rotor position angles $\Theta_0+\Delta\Theta$ of the matrix elements is very computationally intensive, and requires a microcontroller that is capable of higher performance than would be commercially appropriate for the majority of applications.

In the manner according to the invention, therefore, the transformation is divided through a trigonometrical transformation and matrix decomposition into two partial transformations. The first partial transformation calculates the voltage pointers $U_\alpha$, $U_\beta$ fixed in respect of the stator at the time of the first edge of the drive pulse for the three-phase motor from the voltage pointers $U_D$, $U_Q$ fixed in respect of the rotor, and can consequently be used for both edges, which saves computing time.

The second partial transformation into the right-hand part of the first line of FIG. 2 calculates the partial rotation through a small angle, and is, in the manner according to the invention, only carried out approximately, in that the sine and cosine functions are replaced by a number of terms of a Taylor series for the sine and cosine functions sufficient for the accuracy requirements. In addition, the calculation is used for a number of partial rotations sufficient for the accuracy requirements, and consequently only recalculated for example every three or four partial rotations. This too saves a great deal of computing time, but nevertheless yields sufficient accuracy without entirely foregoing calculation of the second edge.

An approximation for very small angles is finally shown in the lower line of the equation of FIG. 2, where only the first term of a Taylor series is used, in that the cosine is approximated by 1 and the sine of an angle approximated by the angle itself.

The invention claimed is:

1. A method for field-oriented control of a frequency converter for a three-phase motor, which comprises the steps of:
performing a setting of a new position of a rotary field in the three-phase motor by means of voltage pulses for stator coils, wherein an amplitude and an angle of a rotary field vector are specified by a duration of the voltage pulses for respective coils and by a temporal offset, wherein the duration and an offset of the voltage pulses for the stator coils are a result of a calculation of manipulated variables in a digitally controlled process in a coordinate system fixed in respect of a rotor, depending on a prevailing angular rotation and a prevailing speed of rotation as well as on a prevailing current values, a predetermined torque and a predetermined speed of rotation, and the manipulated variables calculated in the coordinate system that is fixed in respect of the rotor are converted through a reverse transformation into manipulated variables in the coordinate system fixed in respect of a stator;
determining times for edges of the voltage pulses from the manipulated variables in the coordinate system fixed in respect of the stator; and
dividing the calculation of the manipulated variables in the coordinate system fixed in respect of the stator for a second edge of a voltage pulse into two partial calculations with an angle of rotation for a first edge and with an angle of rotation from the first edge to the second edge, wherein a first partial calculation of manipulated variables for the first edge is also used for the second edge, and a second partial calculation of the manipulated variables is used for a predetermined number of coordinate rotations.

2. The method according to claim 1, wherein, in the second partial calculation, a reverse transformation matrix approximates a cosine of a partial angle of rotation by 1 and a sine of the partial angle of rotation by the partial angle of rotation itself.

3. The method according to claim 1, which further comprises:
using a value of a time for the first edge of the voltage pulse for calculating a time for the second edge of the voltage pulse; and
performing the reverse transformation into the coordinate system fixed in respect of the stator by means of an angle of rotation that is extrapolated from the angle of rotation for the first edge of the voltage pulse and the prevailing speed of rotation.

* * * * *